(12) United States Patent
Jackson et al.

(10) Patent No.: US 9,418,370 B2
(45) Date of Patent: Aug. 16, 2016

(54) OBTAINING EVENT REVIEWS

(71) Applicants: Dean Kenneth Jackson, Pittsburgh, PA (US); Daniel Victor Klein, Pittsburgh, PA (US)

(72) Inventors: Dean Kenneth Jackson, Pittsburgh, PA (US); Daniel Victor Klein, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/658,490

(22) Filed: Oct. 23, 2012

(65) Prior Publication Data

US 2014/0115498 A1  Apr. 24, 2014

(51) Int. Cl.
*G06F 3/01* (2006.01)
*G06Q 30/02* (2012.01)

(52) U.S. Cl.
CPC .................................. *G06Q 30/0203* (2013.01)

(58) Field of Classification Search
CPC .... G06F 15/16; G06F 17/30864; G06F 3/048
See application file for complete search history.

(56) References Cited

U.S. PATENT DOCUMENTS

| | | |
|---|---|---|
| 6,421,358 B1 | 7/2002 | Stimmel et al. |
| 6,513,014 B1 | 1/2003 | Walker et al. |
| 6,557,041 B2 | 4/2003 | Mallart |
| 6,940,998 B2 | 9/2005 | Garoutte |
| 6,947,976 B1 | 9/2005 | Devitt et al. |
| 7,298,960 B1 | 11/2007 | Taylor |
| 7,489,946 B2 | 2/2009 | Srinivasan et al. |
| 7,512,829 B2 | 3/2009 | Mital et al. |
| 7,539,747 B2 * | 5/2009 | Lucovsky ............. G06F 21/335 709/217 |
| 7,552,068 B1 | 6/2009 | Brinkerhoff |
| 7,620,902 B2 | 11/2009 | Manion et al. |
| 7,804,426 B2 | 9/2010 | Etcheson |
| 7,812,998 B2 | 10/2010 | Miers |
| 7,844,482 B1 | 11/2010 | Larson |
| 7,849,481 B2 | 12/2010 | Moon et al. |
| 7,903,904 B1 | 3/2011 | Loeb et al. |
| 7,917,859 B1 | 3/2011 | Singh et al. |
| 8,359,285 B1 * | 1/2013 | Dicker et al. .................... 706/45 |
| 8,359,540 B2 | 1/2013 | Darling |
| 8,380,039 B2 | 2/2013 | Luo et al. |
| 8,412,773 B1 | 4/2013 | Chapweske et al. |
| 8,630,494 B1 | 1/2014 | Svendsen |

(Continued)

FOREIGN PATENT DOCUMENTS

| | | |
|---|---|---|
| JP | 2004-222056 A | 8/2004 |
| JP | 2007-249821 | 9/2007 |

(Continued)

OTHER PUBLICATIONS

Florian, Alt et al., Location-based Crowdsourcing: Extending Crowdsourcing to the Real World, Oct. 2010, Proceedings NordiCHI Oct. 16-20, 2010 pp. 13-22.*

(Continued)

*Primary Examiner* — Tuan S Nguyen

(57) ABSTRACT

Embodiments generally relate to obtaining event reviews. In one embodiment a method includes receiving location data corresponding to a location of a device and receiving temporal data corresponding to a time when the device was at the location. The method also includes obtaining event information based on the location data and the temporal data, and generating a user interface on the device to permit reviews of an event associated with the event information. The method also includes generating one or more prompts based on the location data and the temporal data.

18 Claims, 5 Drawing Sheets

(56) References Cited

U.S. PATENT DOCUMENTS

| | | | |
|---|---|---|---|
| 8,730,397 B1 | 5/2014 | Zhang | |
| 8,761,523 B2 | 6/2014 | Cok et al. | |
| 8,914,483 B1 | 12/2014 | Dixon et al. | |
| 2003/0214128 A1 | 11/2003 | Roberts et al. | |
| 2004/0073615 A1 | 4/2004 | Darling | |
| 2005/0010470 A1 | 1/2005 | Marino | |
| 2005/0021822 A1 | 1/2005 | Cherkasova et al. | |
| 2005/0105396 A1 | 5/2005 | Schybergson | |
| 2005/0187943 A1 | 8/2005 | Finke-Anlauff et al. | |
| 2006/0112080 A1 | 5/2006 | Chen et al. | |
| 2006/0125930 A1 | 6/2006 | Mindrum et al. | |
| 2006/0159007 A1 | 7/2006 | Frutiger et al. | |
| 2006/0234769 A1 | 10/2006 | Srinivasan et al. | |
| 2006/0287105 A1 | 12/2006 | Willis | |
| 2007/0022447 A1 | 1/2007 | Arseneau et al. | |
| 2007/0219949 A1* | 9/2007 | Mekikian | 707/2 |
| 2007/0260361 A1 | 11/2007 | Etcheson | |
| 2007/0266047 A1 | 11/2007 | Cortes et al. | |
| 2008/0005761 A1* | 1/2008 | Repasi | H04H 60/33 725/13 |
| 2008/0086511 A1 | 4/2008 | Takao | |
| 2008/0114844 A1 | 5/2008 | Sanchez et al. | |
| 2008/0133697 A1 | 6/2008 | Stewart et al. | |
| 2008/0136930 A1 | 6/2008 | Nagai | |
| 2008/0144135 A1 | 6/2008 | Miers | |
| 2008/0184139 A1 | 7/2008 | Stewart et al. | |
| 2008/0189175 A1 | 8/2008 | Chan | |
| 2008/0201299 A1 | 8/2008 | Lehikoinen et al. | |
| 2008/0301736 A1 | 12/2008 | Heilbron et al. | |
| 2009/0019902 A1 | 1/2009 | Baranek | |
| 2009/0171873 A1 | 7/2009 | Dolin et al. | |
| 2009/0191902 A1 | 7/2009 | Osborne | |
| 2009/0248692 A1 | 10/2009 | Tsukagoshi | |
| 2009/0248703 A1 | 10/2009 | Tsukagoshi et al. | |
| 2009/0276531 A1 | 11/2009 | Myka et al. | |
| 2009/0319472 A1 | 12/2009 | Jain et al. | |
| 2010/0088336 A1* | 4/2010 | Johnston et al. | 707/770 |
| 2010/0124378 A1 | 5/2010 | Das et al. | |
| 2010/0158315 A1 | 6/2010 | Martin | |
| 2010/0169389 A1 | 7/2010 | Weber et al. | |
| 2010/0198880 A1 | 8/2010 | Petersen | |
| 2010/0241945 A1 | 9/2010 | Chen et al. | |
| 2010/0250633 A1 | 9/2010 | Hannuksela et al. | |
| 2010/0262916 A1 | 10/2010 | Jones et al. | |
| 2010/0318611 A1 | 12/2010 | Curtin et al. | |
| 2011/0066743 A1 | 3/2011 | Hurley et al. | |
| 2011/0080424 A1 | 4/2011 | Peters et al. | |
| 2011/0099199 A1 | 4/2011 | Stalenhoef et al. | |
| 2011/0137709 A1 | 6/2011 | Meyer et al. | |
| 2011/0138003 A1 | 6/2011 | Yoon et al. | |
| 2011/0161423 A1 | 6/2011 | Pratt et al. | |
| 2011/0167136 A1 | 7/2011 | Naimark et al. | |
| 2011/0211737 A1 | 9/2011 | Krupka et al. | |
| 2011/0214077 A1 | 9/2011 | Singh et al. | |
| 2011/0238631 A1 | 9/2011 | Cortes et al. | |
| 2011/0270923 A1 | 11/2011 | Jones et al. | |
| 2011/0276513 A1 | 11/2011 | Erhart et al. | |
| 2011/0295667 A1 | 12/2011 | Butler | |
| 2011/0296536 A1 | 12/2011 | Muller et al. | |
| 2012/0007995 A1 | 1/2012 | Barrett | |
| 2012/0023129 A1 | 1/2012 | Vedula et al. | |
| 2012/0027256 A1 | 2/2012 | Kiyohara | |
| 2012/0030194 A1 | 2/2012 | Jain | |
| 2012/0047147 A1 | 2/2012 | Redstone et al. | |
| 2012/0072428 A1 | 3/2012 | Kao et al. | |
| 2012/0079396 A1 | 3/2012 | Neer et al. | |
| 2012/0082378 A1 | 4/2012 | Peters et al. | |
| 2012/0092685 A1 | 4/2012 | Barrett | |
| 2012/0100869 A1 | 4/2012 | Liang et al. | |
| 2012/0102409 A1* | 4/2012 | Fan | H04W 4/00 715/738 |
| 2012/0109901 A1 | 5/2012 | Mase | |
| 2012/0114296 A1 | 5/2012 | Luo et al. | |
| 2012/0122554 A1 | 5/2012 | Paquet et al. | |
| 2012/0123867 A1* | 5/2012 | Hannan | G06Q 30/0261 705/14.58 |
| 2012/0136689 A1 | 5/2012 | Ickman et al. | |
| 2012/0153016 A1 | 6/2012 | Slaby et al. | |
| 2012/0158871 A1 | 6/2012 | Amano et al. | |
| 2012/0179664 A1 | 7/2012 | Auerbach et al. | |
| 2012/0213404 A1 | 8/2012 | Steiner | |
| 2012/0214568 A1 | 8/2012 | Herrmann | |
| 2012/0220314 A1 | 8/2012 | Altman et al. | |
| 2012/0246003 A1* | 9/2012 | Hart et al. | 705/14.57 |
| 2012/0251011 A1 | 10/2012 | Gao et al. | |
| 2012/0278387 A1 | 11/2012 | Garcia et al. | |
| 2013/0006882 A1 | 1/2013 | Galliani | |
| 2013/0101220 A1 | 4/2013 | Bosworth et al. | |
| 2013/0117365 A1 | 5/2013 | Padmanabhan et al. | |
| 2013/0124311 A1* | 5/2013 | Sivanandan et al. | 705/14.51 |
| 2013/0129232 A1 | 5/2013 | Cok et al. | |
| 2013/0141529 A1 | 6/2013 | Sathish | |
| 2013/0232251 A1 | 9/2013 | Pauley | |
| 2013/0305287 A1 | 11/2013 | Wong et al. | |
| 2015/0005010 A1* | 1/2015 | Zhang | H04W 4/023 455/456.3 |

FOREIGN PATENT DOCUMENTS

| | | |
|---|---|---|
| JP | 2008-146174 A | 6/2008 |
| JP | 2008-146230 A | 6/2008 |
| JP | 2010-237751 A1 | 10/2010 |
| JP | 2012-514276 | 6/2012 |
| JP | 2009009204 | 1/2015 |
| KR | 10-2009-0080063 | 7/2009 |
| KR | 10-2010-0120282 | 11/2010 |
| KR | 10-2012-0034600 | 4/2012 |
| WO | 2007/135871 | 11/2007 |
| WO | 2007113462 A1 | 11/2007 |
| WO | 2008/045701 | 4/2008 |
| WO | 2009/076555 | 6/2009 |
| WO | 2009082814 A1 | 7/2009 |
| WO | 2010/108157 | 9/2010 |
| WO | 2011/001587 A1 | 1/2011 |
| WO | 2011149961 A2 | 12/2011 |

OTHER PUBLICATIONS

International Search Report and Written Opinion for corresponding PCT application No. PCT/US2013/066257 mailed Apr. 25, 2014.
Unpublished U.S. Appl. No. 13/346,385, filed Jan. 9, 2012.
Non-Final Rejection, dated Sep. 20, 2013 for U.S. Appl. No. 13/346,385, filed Jan. 9, 2012.
International Preliminary Report on Patentability dated Aug. 21, 2012 for related PCT Application No. PCT/US2012/024874.
International Search Report dated Aug. 23, 2012 for related PCT Application No. PCT/US2012/024874.
Written Opinion From ISA dated Aug. 18, 2013 for related PCT Application No. PCT/US2012/024874.
Non-Final Rejection dated Apr. 2, 2013, for U.S. Appl. No. 13/219,835, filed Aug. 29, 2011.
Final Rejection dated Oct. 9, 2013, U.S. Appl. No. 13/219,835, filed Aug. 29, 2011.
Notice of Allowance, dated Jan. 24, 2014, U.S. Appl. No. 13/050,195, filed Mar. 17, 2011.
Office Action, dated Jan. 29, 2013, U.S. Appl. No. 13/050,195, filed Mar. 17, 2011.
Office Action, dated Sep. 10, 2013, U.S. Appl. No. 13/050,195, filed Mar. 17, 2011.
Office Action, dated Mar. 28, 2014, U.S. Appl. No. 13/050,195, filed Mar. 17, 2011.
Final Office Action, dated Feb. 14, 2014, for U.S. Appl. No. 13/346,385, filed Jan. 9, 2012.
Examination Report, dated Nov. 25, 2014, for Australian Patent Application No. 2012217920.
Non-Final Office Action, dated Mar. 28, 2014, U.S. Appl. No. 13/050,195, filed Mar. 17, 2011.
Notice of Allowance, dated Aug. 15, 2014, U.S. Appl. No. 13/050,195, filed Mar. 17, 2011.
Non-Final Office Action dated Oct. 3, 2014, U.S. Appl. No. 13/542,379, filed Jul. 5, 2012.

(56) References Cited

OTHER PUBLICATIONS

Non-Final Office Action dated Sep. 30, 2014, U.S. Appl. No. 13/534,555, filed Jun. 27, 2012.
Notice of Allowance for U.S. Appl. No. 13/661,425, Dec. 8, 2015.
PCT International Search Report and the Written Opinion of the International Search Authority received in PCT Application No. PCT/US2013/066414, Jan. 29, 2014.
Final Rejection for U.S. Appl. No. 13/661,425, Mar. 10, 2015.
Non-Final Rejection for U.S. Appl. No. 13/542,379, filed Jul. 5, 2012, Nov. 19, 2015.
Notice of Allowance for Japanese Application No. 2013-554527, Nov. 20, 2015.
Notice of Allowance for U.S. Appl. No. 13/534,555, filed Jun. 27, 2012, Oct. 23, 2015.
Non-Final Rejection for U.S. Appl. No. 13/661,425, Sep. 18, 2014.
Non-Final Rejection received for U.S. Appl. No. 14/571,213, Sep. 24, 2015.
Australian Patent Office Patent Examination Report No. 1 for Australian Patent Application No. 2013334606, 2 pages.
"Extended European Search Report", EP Application No. 13737075.5, Jan. 13, 2016, 8 Pages.
USPTO, Final Office Action for U.S. Appl. No. 13/346,385, Feb. 5, 2016, 11 pages.
International Preliminary Report on Patentability dated Jan. 8, 2015 for related PCT Application No. PCT/US2013/048318.
Inernational Search Report and Written Opinion From ISA dated Dec. 9, 2014 for related PCT Application No. PCT/US2013/048318.
Non-Final Rejection, dated Oct. 24, 2014, for U.S. Appl. No. 13/219,835, filed Aug. 29, 2011.
Final Rejection, dated Oct. 9, 2013, U.S. Appl. No. 13/219,835, filed Aug. 29, 2011.
Final Rejection, dated Jun. 4, 2015, U.S. Appl. No. 13/219,835, filed Aug. 29, 2011.
Notice of Allowance dated Jun. 11, 2015 for U.S. Appl. No. 13/534,555, filed Jun. 27, 2012.
Final Rejection dated May 12, 2015 for U.S. Appl. No. 13/542,379, filed Jul. 5, 2012.
Atsushi Hayakawa, "Remarkable Sofware At the Cutting Edge," MacPeople, ASCII Media Works Inc., Aug. 1, 2009, vol. 15, No. 8, p. 176.
Japanese Office Action mailed Aug. 18, 2015 in Japanese Application No. 2013-554527.
Non-Final Rejection dated Jul. 15, 2015, U.S. Appl. No. 13/929,498, filed Jun. 27, 2013.
Non-Final Rejection, dated Jul. 22, 2015 for U.S. Appl. No. 13/346,385, filed Jan. 9, 2012.
Korean Notice of Preliminary Rejection received in Korean Patent Application No. 10-2015-7002159 (with Translation), Jan. 26, 2016, 15 pages.
USPTO, Final Rejection in U.S. Appl. No. 13/929,498, Feb. 25, 2016.
KIPO Notice of Preliminary Rejection, Korean Patent Application No. 10-2015-7013481, Feb. 5, 2016, 11 Pages.
JP Notice of Reasons for Rejection, Japanese Application No. 2015-520534, Mar. 7, 2016, 9 pages.
JPO Notice of Reasons for Rejection, Japanese Application No. 2015-539724, Apr. 4, 2016.
KIPO,Notice of Preliminary Rejection (with English translation) for Korean Patent Application No. 10-2015-7010982, Mar. 8, 2016, 9 pages.

* cited by examiner

OBTAINING EVENT REVIEWS

BACKGROUND

Social network applications often enable users to give reviews of events and destinations. To give reviews on a social network site, a user often takes steps to find the appropriate review web pages in order to enter a review. For example, to review an event or destination, a user typically performs an online search for a web page for reviews, which involves the user typing key words into a search field, pressing a button to initiate the search, and then perusing the search results. The user may then access a web page that permits reviews of events and/or destinations by clicking on a link on the search results page. The user may then enter review information.

SUMMARY

Embodiments generally relate to a system of obtaining online user reviews of events and/or destinations based on mobile device information. In one embodiment, a method includes receiving location data corresponding to a location of a device, and receiving temporal data corresponding to a time when the device was at the location. The method also includes obtaining event information based on the location data and the temporal data, and generating a user interface on the device to permit reviews of an event associated with the event information. The method also includes generating prompts that elicit reviews from the user, and which are based on the location data and the temporal data.

With further regard to the method, in one embodiment, the location data and the temporal data of the device are provided by activity data associated with one or more actions of the user. In some embodiments, the activity data may include check-in information associated with a device (e.g., mobile phone, etc.). As such, the location data and the temporal data may be determined from check-in information. In some embodiments, the activity data may include payment information associated with a device. As such, the location data and temporal data may be determined from payment information. In an embodiment, the method includes modifying the prompts based on a duration of the device at a particular location, where the duration is determined at least in part from the location data and the temporal data. In an embodiment, the method includes modifying the prompts based on determining a number of check-ins input from the device. In an embodiment the method includes modifying the prompts based on determining responses from the device. In an embodiment, the prompts include questions.

In another embodiment the method includes both receiving location data corresponding to a location of a device, where the location data is provided by activity data associated with one or more actions of a user in a social network, and receiving temporal data corresponding to a time when the device was at the location, where the temporal data is provided by activity data associated with one or more actions of the user. The method also includes obtaining event information based on the location data and the temporal data, where the obtaining of event information includes identifying one or more possible events associated with the location data and the temporal data. The method also includes generating a user interface on the device to permit reviews of an event associated with the event information, and generating prompts based on the location data and the temporal data.

In one embodiment, a system includes one or more processors, and logic encoded in one or more tangible media for execution by the one or more processors. When executed, the logic is operable to perform operations including: receiving location data corresponding to a location of a device, receiving temporal data corresponding to a time when the device was at the location, obtaining event information based on the location data and the temporal data, and generating a user interface on the device to permit reviews of an event associated with the event information, and generating prompts based on the location data and the temporal data.

With further regard to the system, in one embodiment, the temporal data of the device is provided by activity data associated with one or more actions of the user. In another embodiment, the location data and the temporal data are determined from check-in information associated with the device. In an embodiment, the location data is determined from payment information associated with the device. In an embodiment, the logic when executed is further operable to perform operations including modifying the prompts based on a duration of the device at a particular location, where the duration is determined at least in part from the location data and the temporal data. In an embodiment, the logic when executed is further operable to perform operations including modifying the prompts based on determining a number of check-ins input from the device. In an embodiment, the prompts include questions.

DETAILED DESCRIPTION

Figure 1:
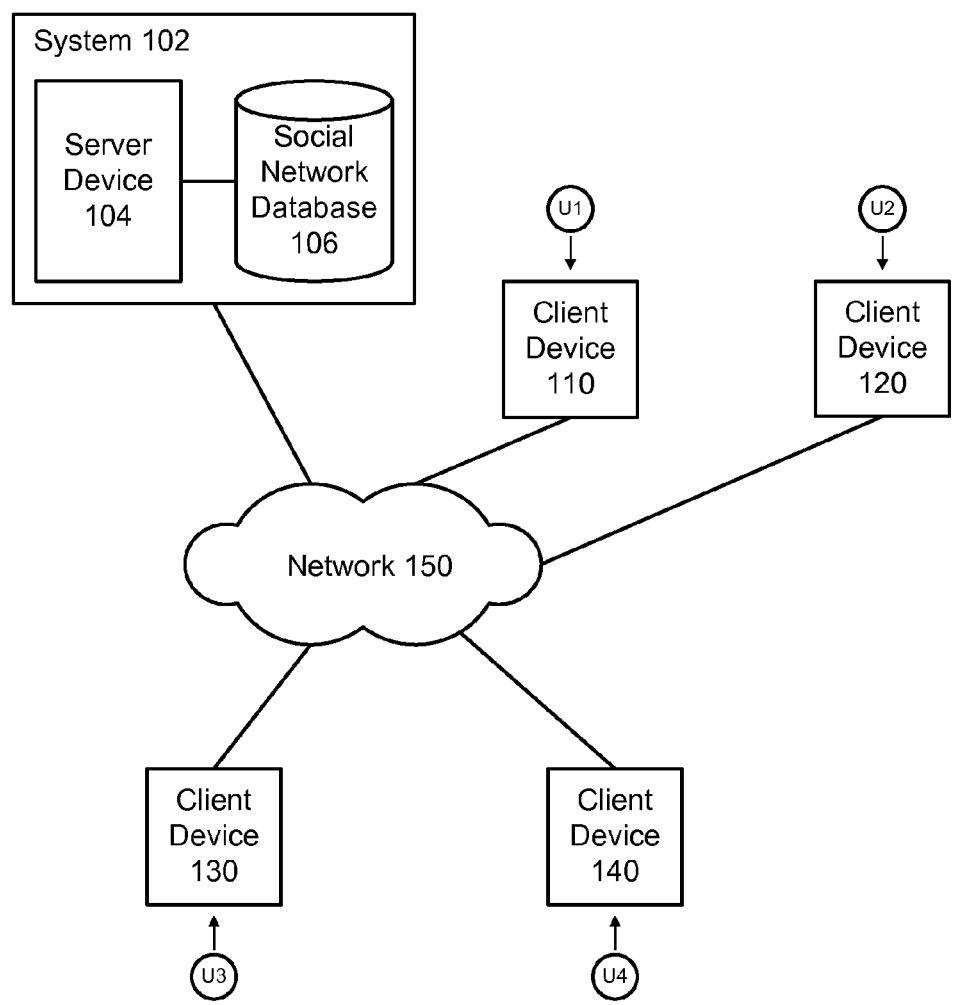
FIG. 1 illustrates a block diagram of an example network environment, which may be used to implement the embodiments described herein.

Embodiments described herein provide a system of obtaining online user reviews of events and/or destinations (e.g., social functions and/or geographical locations that a user may visit, attend, or participate in, etc.) based on mobile device information. In various embodiments, such mobile device information may include location data and time data, which may be gathered in order to generate pertinent prompts for event and/or destination participants. In some embodiments, a system receives location data corresponding to a location of a mobile device. In some embodiments, the system receives temporal data corresponding to a time when the mobile device is at a particular location. The location data and time data may be provided by activity data associated with one or more actions of the user.

The activity data may be determined, for example, from check-in information (e.g., services that allow a user to check-in to a particular location or venue) associated with the device. The system may then determine event information based on the location data and the temporal data. For example, the system may identify one or more possible events associated with the location data and the temporal data. The system may then generate a user interface on the device to permit participant reviews of an event. The system may generate one or more prompts for the reviews based on the location data and the temporal data. For example, the system may generate a first set of prompts for a user in the case that location data and temporal data indicate that a mobile device is present at a location for an entire day (e.g., the user being an employee at the particular location). In another embodiment, the system may generate a second, different set of prompts for a user in the case that location data and temporal data indicate a first check-in for 10 minutes (e.g., the user being a customer).

Embodiments prompt the user to review an event or destination, and may provide appropriate prompts. Embodiments may elicit more event and destination reviews from participants, and may tailor prompts to encourage a range of reviews (e.g., a range of negative to positive reviews). Sometimes a user may not think to post a review unless something out of the ordinary occurred at the event or destination. For example, many users do not think to review many of their favorite destinations or events, and may only post reviews when they have a negative experience with an event or destination.

In various embodiments, an event may be any type of function, celebration, class, ceremony, experience, etc., and such events may occur at respective destinations. The term "event" is hereafter used to connote either an event or a destination. Non-limiting examples may include a gym class, movie, concert, meal at a restaurant, speech, wedding, sports game, match, symphony, store, amusement park trip, birthday party, etc. Examples may also include various combinations of possible events. For example, a user may attend a gym class, movie, have a meal at a restaurant, etc.

FIG. 1 illustrates a block diagram of an example network environment 100, which may be used to implement the embodiments described herein. In one embodiment, network environment 100 includes a system 102, which includes a server device 104 and a social network database 106. In various embodiments, social network database 106 may include a check-in database, a location database, a temporal database, an event database, a geo-location database, and a prompt database. In various embodiments, any one or more of these databases may be contained within the social network database 106 or any other suitable database(s). Network environment 100 also includes client devices 110, 120, 130, and 140 that may communicate with each other via system 102 and a network 150. Each client device 110, 120, 130, and 140 may be any type of electronic device such as a mobile computing device, cell phone, mobile phone, a tablet, a computer, a mobile internet device, a wearable computer, etc.

System 102 may represent multiple systems, server devices, and databases. Also, there may be any number of client devices 110, 120, 130, and 140. In other embodiments, network environment 100 may not have all of the components shown and/or may have other elements including other types of elements instead of, or in addition to, those shown herein. In various embodiments, users U1, U2, U3, and U4 may communicate with each other, and may interact with system 102 using respective client devices 110, 120, 130, and 140.

Figure 2:
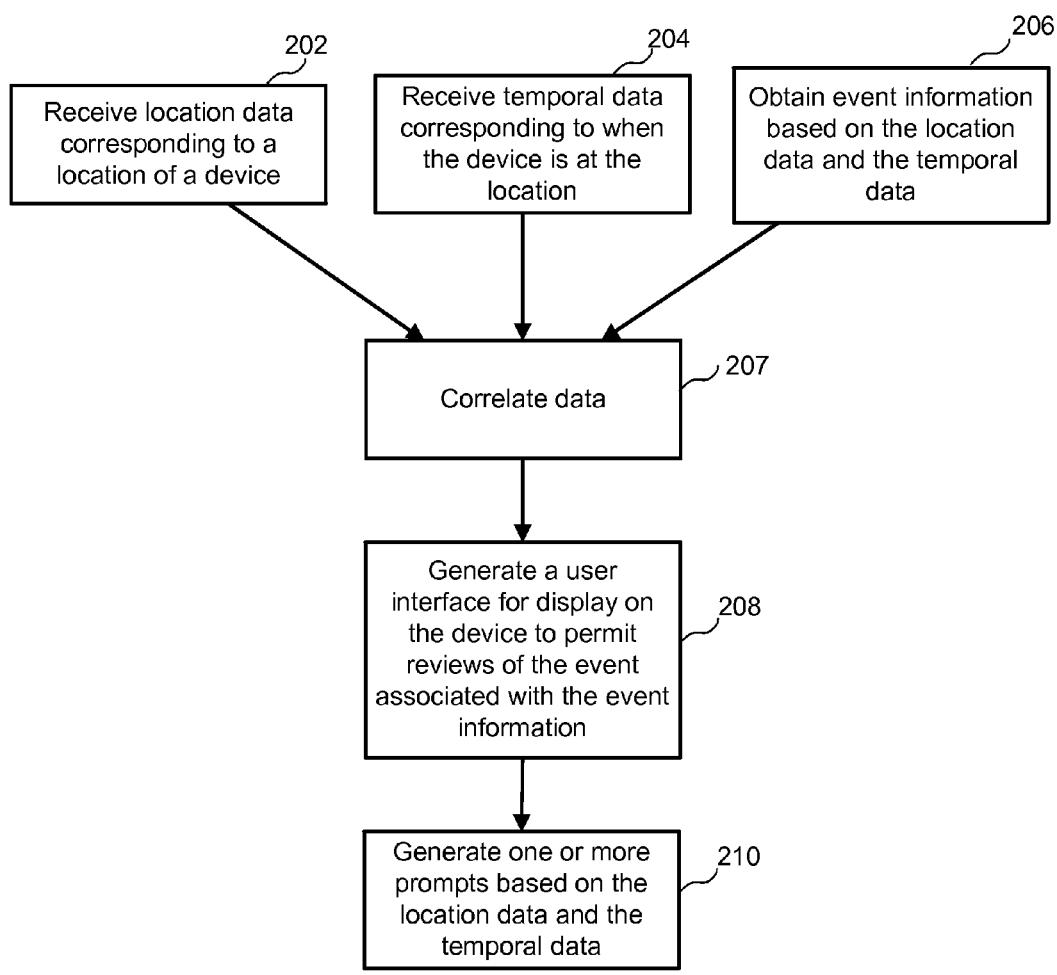
FIG. 2 illustrates an example simplified flow diagram for obtaining event reviews, according to one embodiment.

FIG. 2 illustrates an example simplified flow diagram for obtaining event reviews, using location data and time data to generate prompts, according to one embodiment. Referring to both FIGS. 1 and 2, a method is initiated in block 202, where system 102 receives location data corresponding to a location of a client device. In various embodiments, system 102 may receive location data from social network database 106 or any other suitable database containing check-in information. For example, some social networking services or check-in services allow a user to check-in to a location. In various implementations, check-in information enables a given user, with their consent, to log his or her whereabouts, and/or to inform other users of the social network system of the given user's whereabouts. This information may be stored, for example, on the user's mobile computing device in which the check-in occurred, or the information may be available, with the user's permission, from the user's account.

Location data may be obtained using any suitable approach. For example, a global positioning system (GPS), which may be associated with a client device 110, 120, 130, or 140, may maintain a log file of geographic coordinates. In some implementations, the log file is accessible to the user only, and cannot be obtained from the cellular telephone absent an affirmative act by the user and/or the user's consent. In some implementations, the user may permit the location log file to be maintained on a location database. In another implementation, location data may be obtained from a geo-location database that stores both a user's time and location. Accordingly, the client devices 110, 120, 130, and 140 may obtain user location data from the location database.

In block 204, system 102 receives temporal data corresponding to a time at which a client device 110, 120, 130, or 140 is at the location. In various embodiments, system 102 may receive temporal data from the temporal database. In another embodiment, temporal data may be obtained from a geo-location database that stores both a user's time and location. In various embodiments, system 102 may receive temporal data from the check-in database containing check-in information. For example, some social networking services or check-in services allow a user to check-in to a location. The embodiments described herein also apply to users checking in from any suitable computing device. For example, a user may indicate presence through checking in to a location using a computer terminal or by paying for an event at a ticket kiosk. In some implementations the kiosk or computer terminal may send the check-in information to the user's mobile device via system 102. This check-in information may be stored, for example, on the user's mobile computing device in which the check-in occurred, or the information may be available, with the user's permission, from the user's account. Example accounts may include a user's account with the social network system and/or with a check-in service.

Also, a user may access services by signing into a single account with a unified sign-in system that permits access to multiple services and can be used with any type of client device. For example, the user may sign in to their single account in the unified sign-in system and access various services and applications such as email, web bookmarks, photo sharing applications, search history, review pages, check-in services, or mobile payment services. In the foregoing example, the user could sign in using any type of client device: non-limiting examples include a mobile computing device, cell phone, tablet, laptop, mobile internet device, desktop, or wearable computer.

Temporal data may be obtained using any suitable approach. For example a global positioning system (GPS), which is associated with the client device 110, 120, 130, and 140, may maintain a log file of times when a mobile device was at corresponding locations. In some implementations, the log file is accessible to the user only, and cannot be obtained from the cellular telephone absent an affirmative act by the user and/or the user's consent. In another embodiment, the user may permit the temporal log file to be maintained on a temporal database, accordingly, system 102 may obtain user temporal data from the location database.

For ease of illustration, some embodiments are described in the context of a mobile device. In various embodiments, system 102 may obtain location data and temporal data from any suitable database such as an event database. In some implementations, the event database could be contained within social network database 106, or any other suitable database, or from a combination of any suitable client devices (e.g., client devices 110, 120, 130, and 140).

Referring still to FIG. 2, in block 206, system 102 obtains event information based on the location data and the temporal data. In some embodiments, social network database 106 may be queried for events near a user's time and location. System 102 obtains one or more possible events associated with both the location data and the temporal data. In various embodiments, system 102 may use the location data and the temporal data to search the social network database 106 for events having metadata that is within a range of the specified location data and temporal data. System 102 may identify one or more possible events that correspond to the location data and time data.

For example, if system 102 finds possible events (e.g., a movie, a concert, etc.) in a search, and system 102 determines that a device is present at the location and time of the events, system 102 may postulate or infer that the user associated with the device is attending one of the events and might like to review the event.

In block 207, system 102 correlates received location data, temporal data, and event information, if any. For example, system 102 may determine event information solely from check-in information. In another example, system 102 may determine that there are no events taking place based on the present location and time.

In block 208, system 102 generates a user interface on the device to permit reviews of an event. In various embodiments, the user interface includes brief descriptions of events that may be presented on a device to a user; and the user may select which of those events to review, if any. In some embodiments, a user interface may include a thumbnail image of an event. For example, a user interface may provide a picture of a movie poster, a restaurant sign, or a concert poster.

Figure 3:
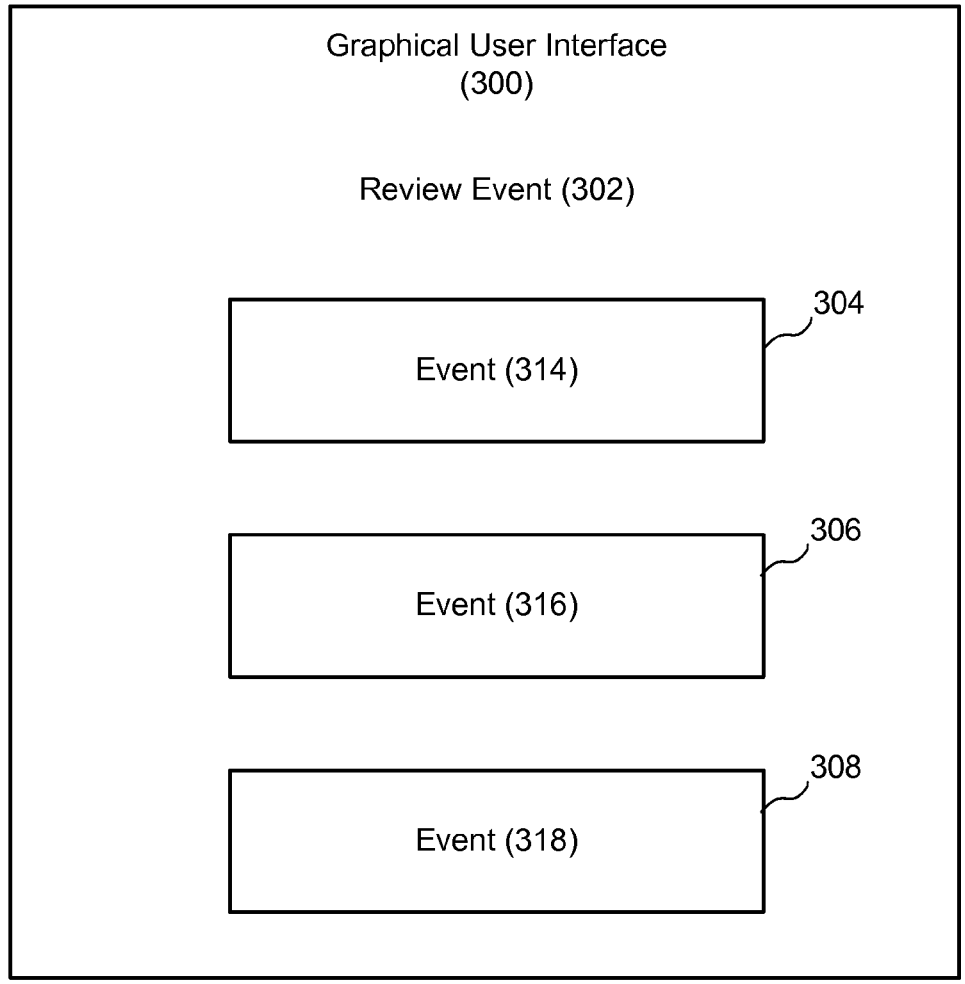
FIG. 3 illustrates an example simplified diagram representing a graphical user interface, where the graphical user interface shows event buttons, according to one embodiment.

FIG. 3 illustrates an example simplified graphical user interface (GUI) 300 of a client device, where GUI 300 displays event buttons corresponding to possible events associated with location data and temporal data, according to some embodiments. As shown in FIG. 3, GUI 300 includes a caption, "Review Event" 302 and event buttons 304, 306, and 308. For example, based on location data and temporal data, system 102 may obtain one or more events and generate event buttons on GUI 300 that correspond to known events and destinations in the location of the user's mobile device.

Referring to FIG. 3, in some embodiments, GUI 300 may display each event by event name on corresponding event buttons. For example, event button 304, event button 306, and event button 308 may have respective button captions that may read "Smith Wedding," "Bean Cafe," and "Muscles Gym," etc., which are referred to as events 314, 316, and 318 respectively. Each displayed event is associated with event information based in part on location data and temporal data, indicating the presence of a device and a user associated with the device. For example, the event information may correspond to a device and a corresponding user being present at a gym, a movie theater, or a concert festival.

Referring to FIG. 3, the particular number (e.g., 3) of elements described (e.g., captions, events, event buttons, etc.) are examples, and any number of elements are possible, depending on the specific implementation. Additionally, event buttons may be replaced by any graphical user interface element that allows a user to choose an event. Examples may include and are not limited to clickable links, clickable image maps, menus, radio buttons, checkboxes, etc.

In an example scenario, the user may check-in at a gym, where event 314 may be a pilates class, event 316 may be a spinning class, and event 318 may be a yoga class. In some implementations, system 102 may use suggestions in the form of event buttons 304, 306, and 308 to be displayed, effectively asking the user to review the pilates class, spinning class, yoga class, etc. In another example scenario, the user may check-in at a movie theater, where event 314 may be a first movie playing at the theater, event 316 may be a second movie playing at the theater, and event 318 may be a third movie playing at the theater. In one example scenario, the user may check-in at a dining complex with multiple restaurants, where event 314 may be a meal at an Italian restaurant, event 316 may be a meal at a French restaurant, and event 318 may be a meal at a Japanese restaurant.

In another example scenario, a user may check-in at a venue that includes a gym, movie theater, and restaurant. In some implementations, based on location data and temporal data, system 102 may present the user with event buttons asking the user to review event 314 a movie, event 316 a yoga class, event 318 a meal at a Japanese restaurant, etc.

In some implementations, if system 102 provides multiple suggestions, system 102 may enable the user to accept one of the prompts by selecting or clicking one of the event buttons. In one embodiment, if there are numerous possible events, system 102 may provide a subset of all possible events in order to simplify the event selection process. In various implementations, the subset provided may be based on any combination of historical user check-in information, temporal data, location data, payment information, search information, etc.

For example, if system 102 determines that over the course of a year the user has never attended a yoga class and user is near the yoga class at the time that it is occurring, the yoga class could be eliminated from the possible events presented for review. In another example, if the user utilizes a mobile payment service to purchase a ticket for a particular movie then system 102 may determine the exact movie the user attended and invite the user to review that movie. In another scenario, if while eating a meal at an Italian restaurant, the user conducts a search for "whole wheat pasta" system 102 may correlate this search with menu data for the restaurant and determine that the user may have tried a particular whole wheat rigatoni dish and invite the user to review that dish.

In one implementation, system 102 may enable the user to manually type in an event and select it. In one implementation, system 102 may enhance manually typed events by providing auto-complete suggestions associated with the event information while the user types.

In block 210, system 102 generates event review prompts that elicit reviews from a user. In some implementations, review prompts may generated or synthesized from any suitable algorithm. In some embodiments, prompts may be obtained from any suitable database. Prompts contain various forms such as radio buttons and checkboxes. For example, review prompts and prompt buttons may correspond to events, based in part on location data and temporal data. Prompts and the generation of prompts are further described with reference to FIG. 4.

Figure 4:
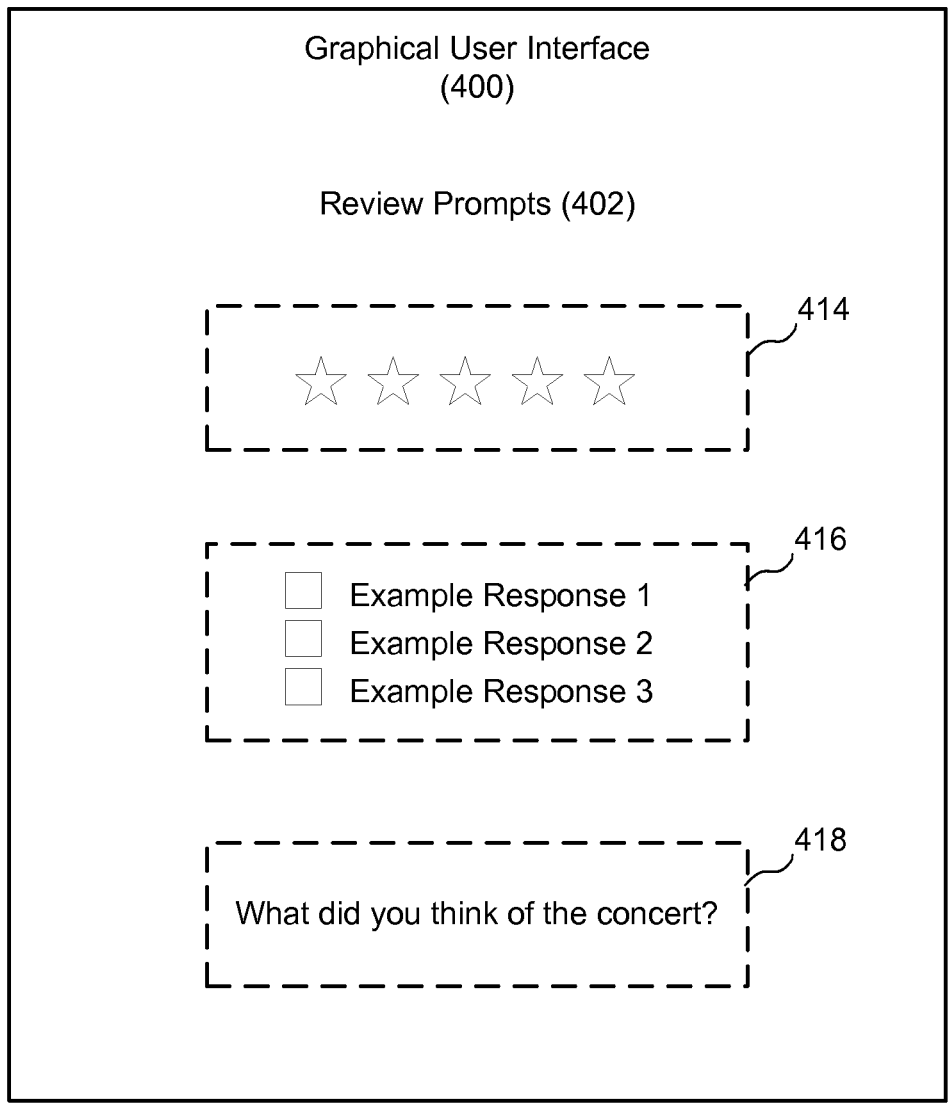
FIG. 4 illustrates an example simplified diagram representing a graphical user interface, where the graphical user interface shows prompts, according to one embodiment.

FIG. 4 illustrates an example simplified graphical user interface (GUI) 400 of a client device, where GUI 400 displays possible prompts associated with events, according to one embodiment. As shown in FIG. 4, GUI 400 includes a caption, "Review Prompts" 402 and prompts 414, 416, and 418. For example, system 102 may obtain one or more prompts and may generate prompts (e.g., prompts 414, 416, and 418) with the corresponding prompts displayed on GUI 400.

In some implementations, an event participant may choose one event from GUI 300 of FIG. 3 by clicking on its corresponding event button (e.g., event button 304, 306, or 308), which may cause GUI 400 to display review prompts relevant to that particular event. As shown in FIG. 4, GUI 400 displays prompts 414, 416, and 418. System 102 may provide such prompts in a variety of ways. For example, in some implementations, the term "prompt buttons" may be expanded to include any number of click-sensitive graphical user elements, such as clickable links or image maps. Prompt buttons may be replaced by any graphical user element that provides similar functionality of allowing the user to choose a prompt or prompts to respond to, such as HTML form input elements (e.g., check boxes, radio-buttons, drop-down lists, etc.).

There are also many ways to answer specific prompts that may be simply represented with text that has no additional functionality. For example, instead of a prompt button, simple text in separate paragraphs may be displayed. After each prompt, input elements such as check boxes, text fields, touch screen numerical rating scales, etc. may be displayed to prompt the user's response to each respective prompt.

Referring to FIG. 4, prompt 414 shows star input elements. In an example scenario, a user may select a star to provide a star rating between one and five stars. Many iterations are possible which share the similar functionality of cueing a user to select a prompt and to capture that user's input in response to the prompt. Clicking a prompt button to answer an event review prompt or providing a direct answer to an input field associated with the review prompt are non-limiting example implementations. Referring to FIG. 4, prompt 416 provides checkboxes corresponding with "Example Responses." Referring again to FIG. 4, prompt 418 may display a question, where user may click on the question to provide an answer. While a particular number (e.g., 3) of elements are described (e.g., captions, prompts, prompt buttons, radio buttons, check boxes, etc.), any number of elements is possible, depending on the specific implementation.

In some implementations, any one or more of prompts 414, 416, and 418, may be presented as questions. In some embodiments, any one or more of prompts 414, 416, and 418 may elicit reviews from a user. Prompts 414, 416, and 418 may be displayed to elicit the user's response and guide the user in an event review. Many iterations are possible which share similar functionality of guiding a user to select a question and capturing that user's input in response to the question prompts. For example, a user may click a question prompt button to answer a question associated with an event review or provide a direct answer to a question to an input field associated with the review.

In one embodiment, prompts 414, 416, and 418, may be generated based on the duration of the user at a particular location. For example, if system 102 determines that a device checks in to a location every morning at 9:00 a.m. and effectively is not present any longer around 6:00 p.m., system 102 may determine that the user associated with the device is an employee at that location, such as a trainer at a gym or a worker at a post office. Accordingly, system 102 will generate prompts for the employee that would be different from a customer of the post office as compared to a worker. For example, system 102 would generate a prompt for the customer that relates to how he or she feels about waiting in line.

In another example implementation, system 102 may generate specific review prompts, based on frequency of visits or attendance. For example, if system 102 determines a device has checked into a movie for a second time, prompts may be focused on how much a user liked the movie the second time. In another example, if system 102 determines a that device has checked-in to an amusement park weekly during the course of a summer, system 102 may generate prompts about new rides in the beginning of the summer, but may not generate prompts about new rides when the user checks-in at the end of the summer.

In various embodiments, prompts may be generated based on predetermined information about a device's home location. For example, if a user consents, a device may include as part of a profile, the device's base or home location. System 102 may determine, based on location data and temporal data, that the device is not proximate its home location and that the user of the device is attending an event while on business or personal travel. System 102 may then generate specific prompts designed to fit the user's traveling profile. For example the prompt may state, "Was this your favorite restaurant on your first trip to Paris?"

In another embodiment, system 102 may generate prompts based on determining that a device is at an event in its home location. For example, system 102 may then generate a prompt such as, "As a Chicagoan, do you feel this restaurant is the best Italian restaurant in Chicago?"

In another example embodiment, system 102 may generate different prompts over multiple visits to an event based on a combination of one or more of the foregoing factors and a user's past responses to prompts. System 102 may also generate prompts by correlating information from one or more of the foregoing factors.

For example, system 102 may present more general prompts on the first check-in of a device at a sports game such as: "What did you think of the stadium?"; "What do you think of the team?"; or "What did you think of the game?" In subsequent visits, based on mobile payment information, if a user has user has consented to the use of such information, then system 102 may ask, "What did you think of the hot dogs?" Or if in past responses to, "What do you think of the team?", the user has repeatedly responded with the same response, for example "great", system 102 may stop asking that prompt.

In another example scenario, system 102 may determine based on the duration of a user's stay at a restaurant that the user has ordered take-out. For example, system 102 may evaluate the time that the user is at the location based on location data and temporal data. If the time falls within a predetermined range (e.g., less than 10 minutes), system 102 may determine that user is likely ordering take-out. System 102 may correlate this take-out determination with mobile payment information. For example, system does not confuse a scenario where a user has simply stopped by the restaurant to peruse a menu. Once system 102 determines that an order is take-out, prompts may focus, for example, more on issues associated with take-out (e.g., whether the packaging is leak proof, utensils are provided, and hotness of food is proper when picked up). In another embodiment, system 102 may determine that a user has used a mobile or phone based ordering system and requested home delivery of a restaurant food order. Accordingly, upon delivery of the food order, system 102 may generate prompts that relate to delivery times and courtesy of the delivery person.

By virtue of the of the foregoing process, a user is prompted to review an event and is guided by context specific prompts while the user is attending or has just completed an event. In some embodiments, prompts may be generated through a search corresponding to check-in information. Some services, such as location based check-in services and/or social networking services, allow a user to check-in to a location (e.g., an event). This information may be available, with the user's permission from their account or may be stored (e.g., on the user's mobile computing device).

In some implementations, the check-in information may contain geographic coordinates, which identify an event or site (e.g., a particular movie theater, etc.) or specific location within the event or site. The check-in information may also contain the time at which the user checked in. This information may be used to fetch pertinent review prompts.

In another example scenario, a user may check-in at a store. While browsing at the store the user may perform searches on a mobile device for red shoes. System 102 may correlate search data with store inventory data. As such, system 102 may present the user with prompts about particular merchandise (e.g., brands of shoes that include red color pairs in particular styles, etc.).

In an example scenario, user may check into an event such as a concert on a cell phone and indicate that they do not wish to receive review prompts during the concert. If user consents, system 102 could prompt user for a review of the concert later in time. For example, when user logs onto their desktop or tablet computer at home or while traveling the next day, they could receive an email with review questions about the concert.

Responses to prompts may be presented in various ways. For example, system 102 may generate multiple choice response buttons (not shown) on GUI 400 that correspond to prompts. In an example, response buttons could include ranges of answers such as very satisfied, satisfied, neutral, and dissatisfied. In another example, prompts could ask for numerical ratings in a pre-defined range such as 1-30 for various characteristics. For example, for a restaurant, users could be asked to provide a rating for food, décor, and service. In another example embodiment, prompts could cue the user to enter an overall rating for a place or event. In another embodiment, prompts could cue the user to enter ratings for categories of appeal, facilities, and service.

In one embodiment, system 102 may enable the user to manually type in responses to prompts. In one embodiment, manually typed responses be enhanced by system 102 providing auto-complete suggestions of known responses from response information while the user types.

Although the steps, operations, or computations described herein may be presented in a specific order, the order may be changed in particular embodiments. Other orderings of the steps are possible, depending on the particular implementation. In some particular embodiments, multiple steps shown as sequential in this specification may be performed at the same time.

While system 102 is described as performing the steps as described in the embodiments herein, any suitable component or combination of components of system 102 or any suitable processor or processors associated with system 102 may perform the steps described.

In situations where system 102 collects and/or uses personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server (not shown) that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location cannot be determined. Thus, the user may have control over how information is collected by system 102 and used by a content server.

Figure 5:
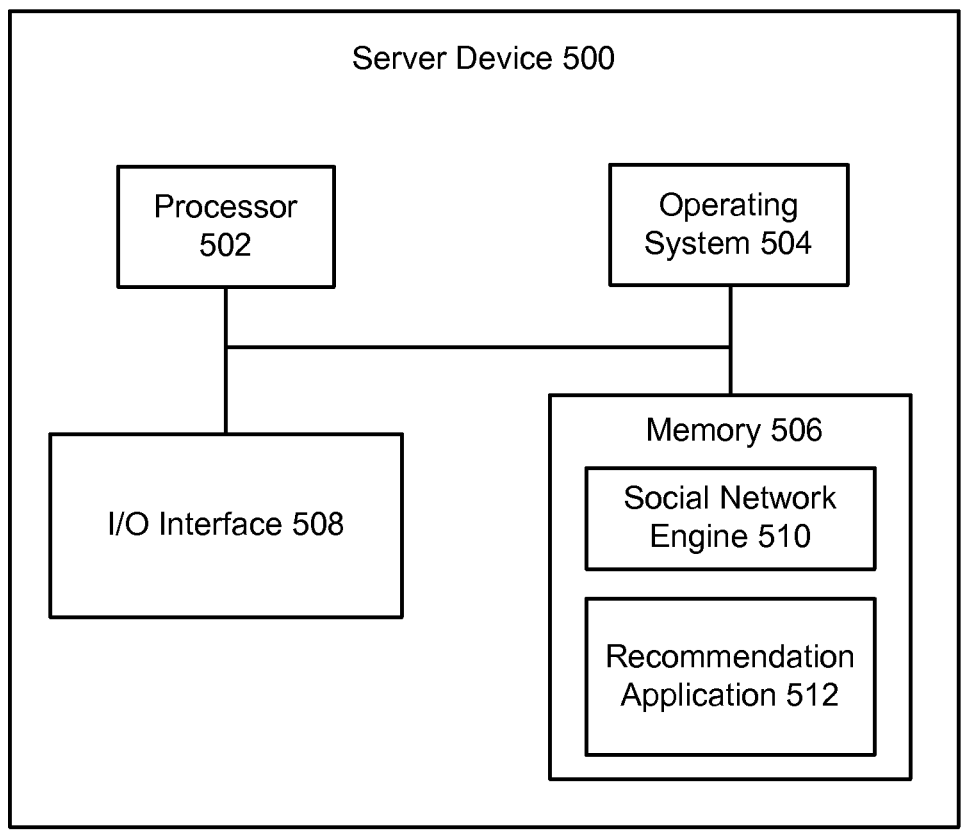
FIG. 5 illustrates a block diagram of an example server device, which may be used to implement the embodiments described herein.

FIG. 5 illustrates a block diagram of an example server device 500, which may be used to implement the embodiments described herein. For example, server device 500 may be used to implement server device 104 of FIG. 1, as well as to perform the method embodiments described herein. In one embodiment, server device 500 includes a processor 502, an operating system 504, a memory 506, and an input/output (I/O) interface 508. Server device 500 also includes a social network engine 510 and a recommendation application 512, which may be stored in memory 506 or on any other suitable storage location or computer-readable medium. Recommendation application 512 provides instructions that enable processor 502 to perform the functions described herein and other functions.

For ease of illustration, FIG. 5 shows one block for each of processor 502, operating system 504, memory 506, I/O interface 508, social network engine 510, and media application 512. These blocks 502, 504, 506, 508, 510, and 512 may represent multiple processors, operating systems, memories, I/O interfaces, social network engines, and recommendation applications. In other embodiments, server device 500 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and embodiments.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

What is claimed is:

1. A non-transitory computer-readable medium storing instructions executable by at least one processor, the instructions causing the at least one processor to perform operations to obtain reviews, the operations comprising:

receiving location data corresponding to a location of a device, wherein the location data is provided by activity data associated with one or more actions of a user in a social network;

receiving temporal data corresponding to a time when the device was at the location, wherein the temporal data is provided by activity data associated with one or more actions of the user;

correlating payment data with the location data and temporal data;

obtaining event information based on the location data, the temporal data, and the payment data, the event information identifying one or more events that the user participated in at a geographical destination;

generating a first user interface on the device to permit selection by the user of one event of the one or more events;

generating a second user interface on the device to facilitate a review by the user of the one event;

generating one or more prompts for the second user interface, wherein the one or more prompts are customized for the user based on a context of the user using one or more of the location data, the temporal data, or the payment data; and modifying the one or more prompts based on a duration the device was at a particular location, wherein the duration is determined at least in part from the location data and the temporal data.

2. The non-transitory computer-readable medium of claim 1, wherein the location data and the temporal data are determined from check-in information associated with the device.

3. The non-transitory computer-readable medium of claim 1, wherein the instructions for generating one or more prompts for the second user interface when executed further cause the at least one processor to modify the one or more prompts based on determining a number of check-ins input from the device.

4. A method to obtain reviews of events, comprising:

receiving location data corresponding to a location of a device;

receiving temporal data corresponding to a time when the device was at the location;

correlating payment data with the location data and the temporal data;

obtaining event information based on the location data, the temporal data, and the payment data, the event information identifying one or more events that a user of the device participated in at a geographical destination;

generating a first user interface on the device to permit selection of one event of the one or more events;

generating a second user interface on the device to permit a review of the one event, the second user interface comprising one or more prompts, wherein the one or more prompts are customized based on a context of the user using one or more of the location data, the temporal data, or the payment data; and modifying the one or more prompts based on a duration the device was at a particular location, wherein the duration is determined at least in part from the location data and the temporal data.

5. The method of claim 4, wherein the location data of the device is provided by activity data associated with one or more actions of the user.

6. The method of claim 4, wherein the temporal data of the device is provided by activity data associated with one or more actions of the user.

7. The method of claim 4, wherein the location data and the temporal data are determined from check-in information associated with the device.

8. The method of claim 4, wherein the location data is determined from payment information associated with the device.

9. The method of claim 4, wherein the method further comprises:

modifying the one or more prompts based on determining a number of check-ins input from the device.

10. The method of claim 4, wherein the method further comprises:

modifying the one or more prompts based on determining responses from the device.

11. The method of claim 4, wherein the one or more prompts includes a question.

12. A system to obtain reviews of events, comprising:

one or more processors; and logic encoded in one or more tangible media for execution by the one or more processors and when executed operable to perform operations comprising:

receiving location data corresponding to a location of a device;

receiving temporal data corresponding to a time when the device was at the location;

correlating payment data with the location data and temporal data;

obtaining event information based on the location data, the temporal data, and the payment data, the event information identifying one or more events that a user of the device participated in at a geographical destination;

generating a first user interface on the device to permit selection of one event of the one or more events;

generating a second user interface on the device to permit a review of the one event, the user interface comprising one or more prompts, wherein the one or more prompts are customized based on a context of a user and determined using one or more of the location data, the temporal data, or the payment data; and modifying the one or more prompts based on a duration the device was at a particular location, wherein the duration is determined at least in part from the location data and the temporal data.

13. The system of claim 12, wherein the location data of the device is provided by activity data associated with one or more actions of the user.

14. The system of claim 12, wherein the temporal data of the device is provided by activity data associated with one or more actions of the user.

15. The system of claim 12, wherein the location data and the temporal data are determined from check-in information associated with the device.

16. The system of claim 12, wherein the location data is determined from payment information associated with the device.

17. The system of claim 12, wherein the logic when executed is further operable to perform operations comprising modifying the one or more prompts based on determining a number of check-ins input from the device.

18. The system of claim 12, wherein the one or more prompts includes a question.

* * * * *